US010724693B2

(12) United States Patent
Kennedy

(10) Patent No.: US 10,724,693 B2
(45) Date of Patent: Jul. 28, 2020

(54) STACKABLE TOWER TRAILER

(71) Applicant: Gino Kennedy, Jacksonville, FL (US)

(72) Inventor: Gino Kennedy, Jacksonville, FL (US)

( * ) Notice: Subject to any disclaimer, the term of this patent is extended or adjusted under 35 U.S.C. 154(b) by 130 days.

(21) Appl. No.: 15/818,215

(22) Filed: Nov. 20, 2017

(65) Prior Publication Data

US 2018/0073691 A1  Mar. 15, 2018

Related U.S. Application Data

(63) Continuation of application No. 14/732,128, filed on Jun. 5, 2015, now Pat. No. 9,897,268.

(60) Provisional application No. 62/145,002, filed on Apr. 9, 2015, provisional application No. 62/008,848, filed on Jun. 6, 2014.

(51) Int. Cl.
*F21L 13/00* (2006.01)
*E04H 12/34* (2006.01)
*E04H 12/18* (2006.01)
*B60P 3/18* (2006.01)

(52) U.S. Cl.
CPC ............ *F21L 13/00* (2013.01); *E04H 12/345* (2013.01); *B60P 3/18* (2013.01); *E04H 12/187* (2013.01)

(58) Field of Classification Search
CPC ...... F21L 13/00; E04H 12/345; E04H 12/187; E04H 12/182; B60P 3/18; F21V 21/22; F21W 2131/10; F21W 2131/40; B60D 63/061
See application file for complete search history.

(56) References Cited

U.S. PATENT DOCUMENTS

| 3,439,467 | A | * | 4/1969 | Partlow ................ E04H 12/182 182/141 |
| 3,495,364 | A | | 2/1970 | De Bella |
| 4,181,929 | A | | 1/1980 | Barber et al. |
| 4,220,981 | A | * | 9/1980 | Koether ................ B60P 3/18 362/238 |
| 4,600,980 | A | * | 7/1986 | Dahlgren ............. E04H 12/182 362/385 |
| 5,806,963 | A | | 9/1998 | Miller et al. |
| 6,241,438 | B1 | * | 6/2001 | Corbett .................... B60P 3/08 362/427 |
| 6,517,225 | B1 | | 2/2003 | Allen et al. |
| 6,805,462 | B1 | | 10/2004 | Smith et al. |
| 7,432,606 | B2 | | 10/2008 | Yamamoto et al. |
| 7,621,650 | B2 | | 11/2009 | Nalitchaev et al. |

(Continued)

*Primary Examiner* — Y M. Quach Lee
(74) *Attorney, Agent, or Firm* — McHale & Slavin, P.A.

(57) ABSTRACT

A portable tower trailer having a light tower housing constructed to allow for both stacking and nesting which is beneficial in both storage and shipping of light towers is disclosed. The portable tower trailer employs a frame having a hinged axle that allows the wheels to operate in a conventional manner. The hinged axle further allows the wheels to be rotated upward allowing the frame to rest flush on the ground or stacked upon a similar shaped portable tower. The stackable light tower is constructed having a base employing an engine system and a fuel tank; and a mast pivotally coupled to the base and movable between a storage configuration and a positioning configuration. The storage configuration is when the mast is folded over an upper surface of the base whereby an additional light tower base or tower trailer may be placed or stacked over the top of the first light tower base.

7 Claims, 5 Drawing Sheets

(56) References Cited

U.S. PATENT DOCUMENTS

| | | | |
|---|---|---|---|
| 7,667,963 | B2 | 2/2010 | Illerhaus et al. |
| 7,768,799 | B2 | 8/2010 | Cramer et al. |
| 8,303,143 | B2 | 11/2012 | Webb |
| 8,391,012 | B2 | 3/2013 | Trine et al. |
| 8,439,534 | B1 * | 5/2013 | Roe ....................... F21V 11/183 362/285 |
| 8,616,159 | B1 | 12/2013 | Hawkins |
| 8,950,530 | B2 | 2/2015 | Niedzwiecki |
| 9,316,408 | B2 | 4/2016 | Justus |
| 9,897,268 | B2 * | 2/2018 | Kennedy ................. F21L 13/00 |
| 2009/0261546 | A1 * | 10/2009 | Rowland ............... B60P 1/6481 280/33.997 |
| 2010/0220489 | A1 * | 9/2010 | Konop ..................... B60P 3/18 362/428 |
| 2015/0059662 | A1 | 3/2015 | Lan et al. |
| 2017/0141721 | A1 | 5/2017 | Schmidt |

* cited by examiner

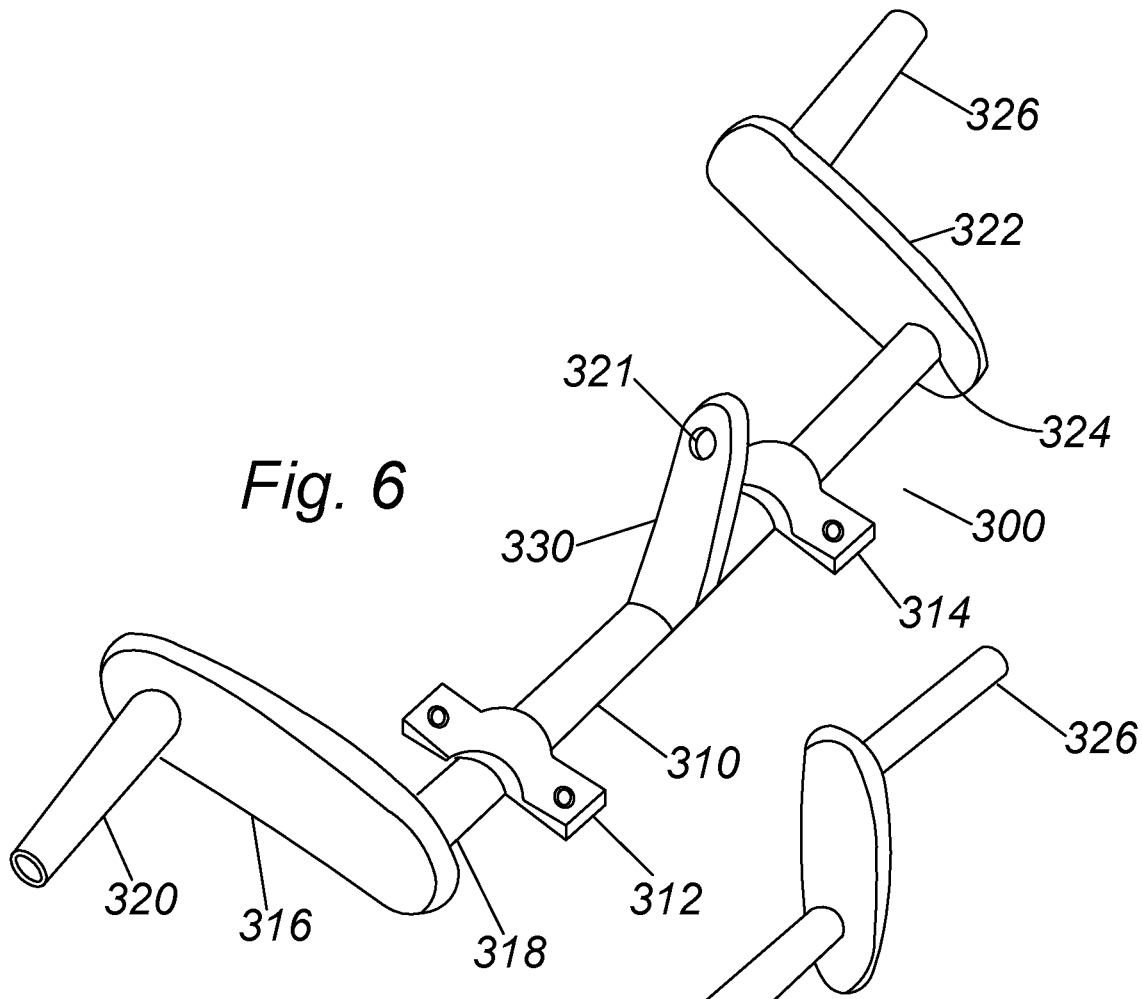
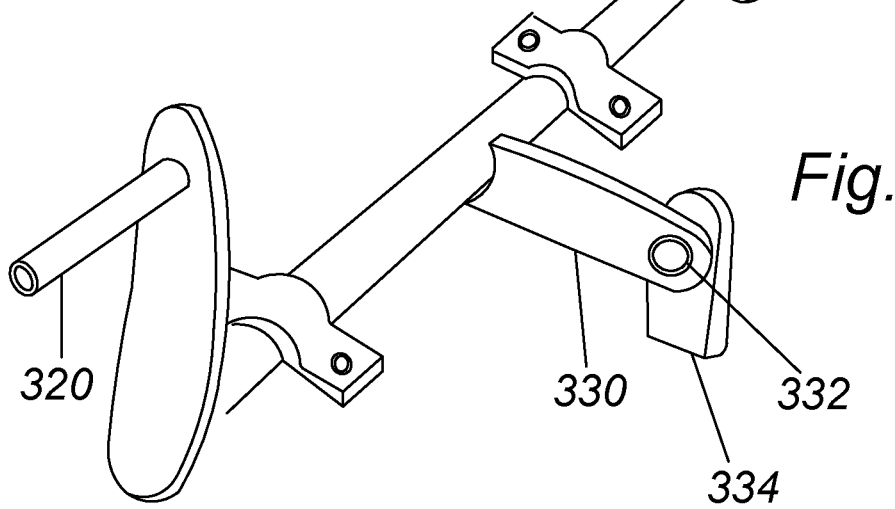

STACKABLE TOWER TRAILER

CROSS REFERENCE TO RELATED APPLICATIONS

In accordance with 37 C.F.R. 1.76, a claim of priority is included in an Application Data Sheet filed concurrently herewith. Accordingly, the present application is a Continuation of U.S. patent. Ser. No. 14/732,128 entitled "Stackable Tower Trailer", filed Jun. 5, 2015, which claimed priority to U.S. Provisional Patent Application No. 62/145,002, entitled "Stackable Tower Trailer", filed Apr. 9, 2015, and U.S. Provisional Patent Application No. 62/008,848, entitled "Stackable Light Plant", filed Jun. 6, 2014. The contents of each of the above referenced applications are incorporated herein by reference.

FIELD OF THE INVENTION

The instant invention relates to portable towers and more specifically to a trailer mounted tower unit that is stackable.

BACKGROUND OF THE INVENTION

Portable towers employ a mast for positioning lights, speakers, signs or the like in a raised position in a quick and efficient setup. For instance, portable towers can be used to provide enhanced communication by extending the height of an antenna. Another more common example is the use of a portable tower to place lights in an elevated position for illumination of special events, road and bridge construction, emergency and disaster relief, and general construction sites.

Portable light towers include a mast, preferably telescoping, which upwardly extends from a base to support a bank of lights overhead to temporarily illuminate an area in low lighting conditions. Typically the area to be illuminated is devoid of electrical power wherein the portable light towers have their own source of power such as batteries or an engine/generator system. In other instance, the area to be illuminated is devoid of light after dusk where sunlight is not available wherein the self-powered portable light tower provides sufficient illumination to sites such as building construction, highway construction, carnivals, outdoor sporting and recreational activities, and the like. Portable light towers are well known in the art and typically include wheels for ease in transporting. Prior art disclosures include portable lighting systems exemplified in U.S. Pat. Nos. 3,439,467; 3,495,364; 4,181,929; 5,806,963; 6,517,225; 6,805,462; 7,621,650; 8,303,143; and 8,439,534.

Presently existing light towers lack compact storage features which can affect shipping as well as storage. Existing light towers are typically trailer mounted and towed to a deployment site. Trailer mounted light towers are transported to a jobsite either by towing behind a vehicle, or by placement on a flatbed where they are offloaded at the jobsite. For instance, if a carnival needs ten light towers then it may need ten vehicles and associated personnel to transport the ten light towers individually and separately. Similarly, road construction sites may require placement of several light towers along a length of road, thus each of the light towers must be transported to the site by a separate vehicle. Placing multiple light towers on a single large common trailer, such as a flatbed, is limited to the length and width of the flatbed. Furthermore, placing multiple light towers mounted on a flatbed or on a single large common trailer is limited since all known prior art light towers have no provision for nesting or stacking. Existing light towers lack compact storage features which can cause problems in shipping as well as storage, what is needed in the industry is a stackable tower trailer constructed and arranged to allow multiple trailers to be stacked providing benefits in both shipping and storage, thereby reducing personnel, shipping, and storage costs.

Thus what is needed in the industry is a portable light tower having a housing constructed and arranged to allow both nesting and stacking to benefit both storage and shipping of light towers.

SUMMARY OF THE INVENTION

A portable tower trailer having a light tower housing constructed and arranged to allow both nesting and stacking which is beneficial and efficient in both storage and shipping of light towers is disclosed. In preferred embodiments, the frames are stackable. The portable tower trailer employs a frame having a hinged axle that allows the wheels to operate in a conventional manner. The hinged axle further allows the wheels to be rotated upward allowing the frame to rest flush on the ground or be stacked upon a similar shaped portable tower. The stackable light tower is constructed having a base and a mast. Within the base is a power system employing an engine/generator system and a large fuel tank. The mast is pivotally coupled to the base and movable between a storage configuration and a positioning configuration. The storage configuration is when the mast is folded over an upper surface of the base in such a position that an additional light tower base may be placed over the top of the first light tower base.

Accordingly, it is an objective of the instant invention to provide a portable tower trailer that is economical to manufacture, maintenance free, safe, efficient and easy to operate and transport. The housing allows the portable tower to be stored adjacent to similar sized light towers using minimum real estate providing a benefit of storage and shipping.

It is another objective of the instant invention to provide a portable tower trailer having a stackable frame and stackable light towers which are constructed and arranged for compact storage and shipping.

Still another objective of the instant invention is to provide a portable tower trailer having a light tower including a generator attached to an engine to eliminate the weight of a conventional bed plate.

Another objective of the instant invention is to provide a portable tower trailer having members constructed and arranged to support like shaped portable tower trailers or light towers in a stacked configuration that can be fastened together for shipping.

It is still an objective of the instant invention is to provide a portable tower trailer including a hinged axle and pivotable hitch.

Yet another objective of the instant invention is to provide a portable tower trailer with stackable light towers each having a skid base including fork lift receiving apertures for each for ease in placement.

Still yet is it objective of the instant invention to provide a portable tower trailer having a light tower that allows multiple trailers or multiple light towers to be stacked providing benefits in both shipping and storage, thereby reducing personnel, shipping, and storage costs in instances such as in road construction sites that require placement of several light towers along a length of road.

It is an objective of the instant invention to provide a portable tower trailer having a light tower that eliminates the need for placing multiple light towers on a single large common trailer, such as a flatbed, where space is limited to the length and width of the flatbed. Multiple light towers can be towed on the portable tower trailer by a vehicle in a stackable or nesting fashion.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 6 is a perspective view of a torsion bar rotatable axle in a lower position;
FIG. 7 is a perspective of the rotatable axle illustrated in FIG. 6 in a raised position.

DETAILED DESCRIPTION OF THE INVENTION

Figure 1:
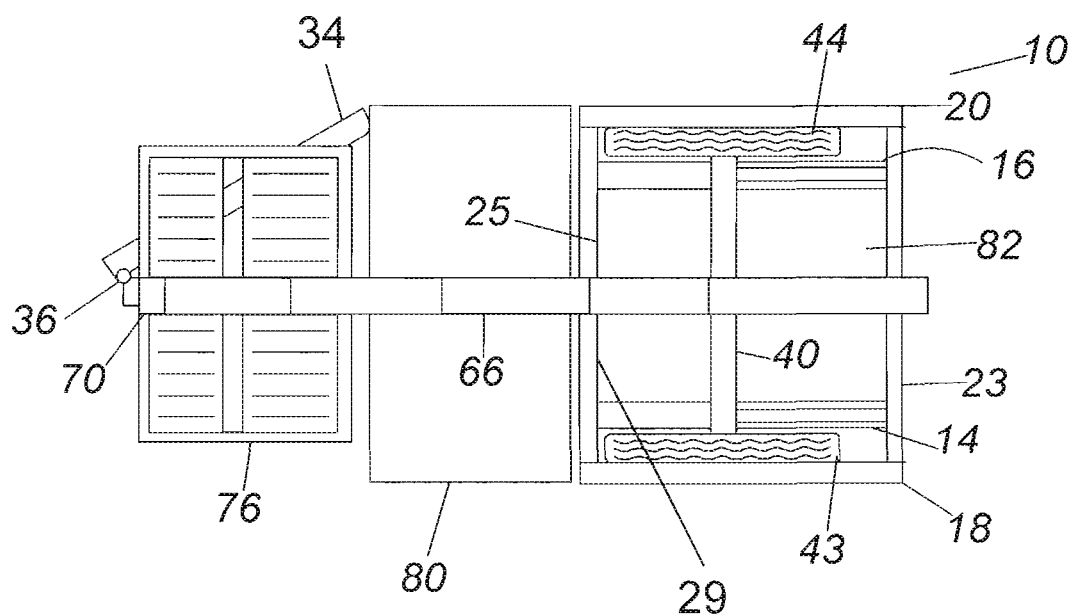
FIG. 1 is a top view of a stackable tower trailer.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 2:
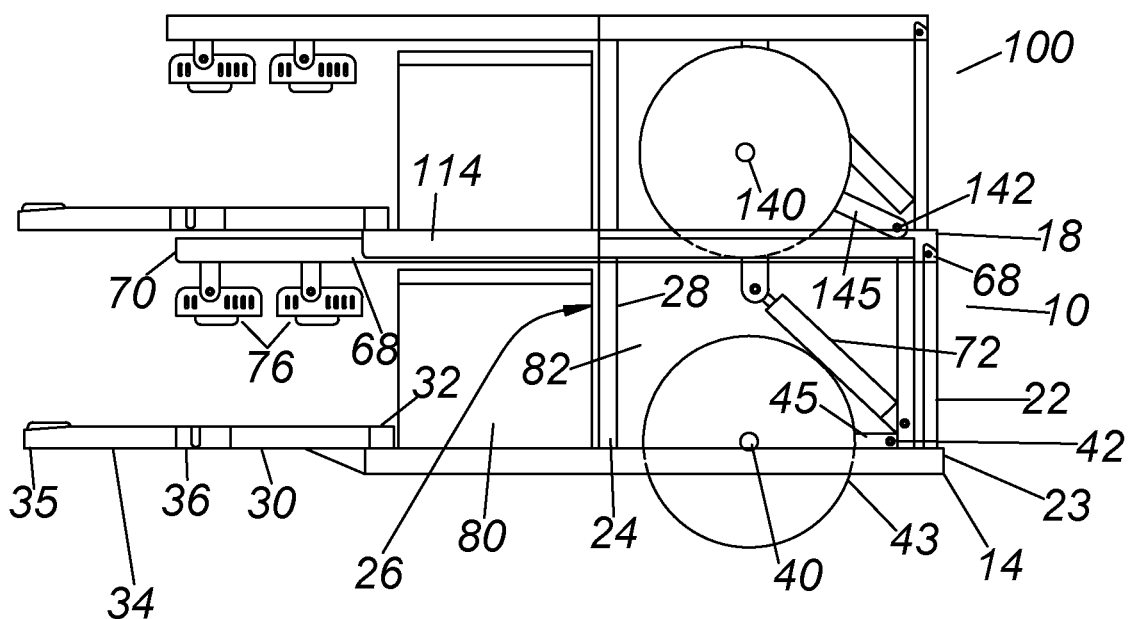
FIG. 2 is a top view of a pair of nested stackable tower trailers.
Figure 3:
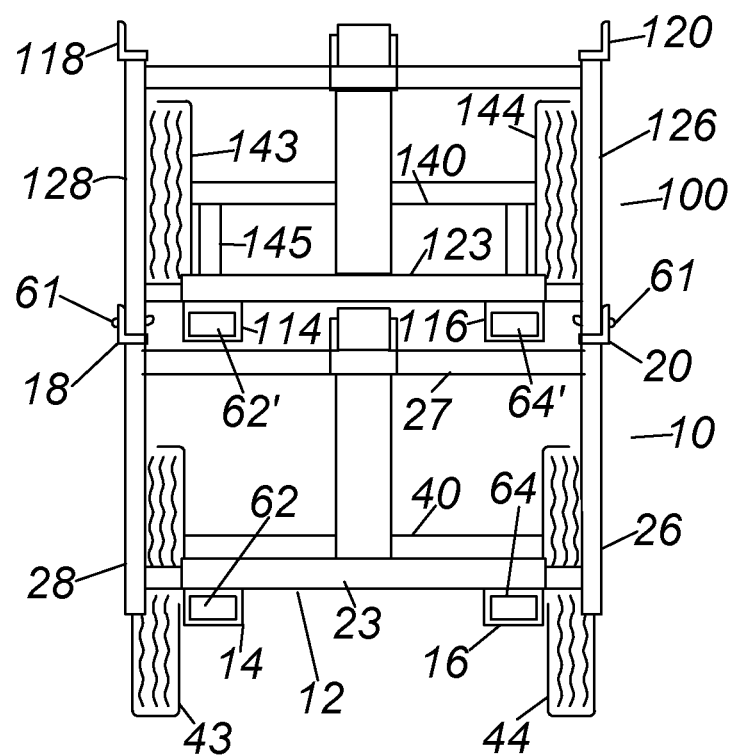
FIG. 3 is an end view of a pair of nested stackable tower trailers.

Referring now to the FIGS. 1-7 in general, set forth is a stackable tower trailer 10 which allows for stacking or nesting of multiple tower trailers or light towers, as discussed below. In preferred embodiments, the towers are stackable and are stacked. As shown in FIGS. 1-3, the stackable tower trailer 10 is comprised of a stacking frame 12 formed from bottom members 14 and 16 spaced apart from top members 18 and 20 by vertical support members 22, 24, 26 and 28. Bottom members 14 and 16 operate as skids wherein placement of the wheels in a raised position allow the bottom members 14 and 16 to support the structure on the ground if no wheels are present, or when the wheels are placed in a raised position. Should the trailer be moved with the wheels raised, the bottom members operate as skids allow the trailers to be dragged over the ground. The stacking frame 12 includes a lower rear cross member 23 and lower front cross member 25, and an upper rear cross member 27 and upper front cross member 29. The bottom members, 14 and 16, extend beyond the upper cross member to a draw bar 30 having a proximal end 32 coupled to the frame and a distal end 34 forming a coupling hitch 35 for attachment to the hitch on a towing vehicle. The draw bar 30 includes a lockable pivot connection 36 that allows the hitch portion 35 to pivot and reduce the overall length of the frame 12. In a preferred embodiment the overall length "L" of the stackable tower trailer 10 is between 96 inches and 102 inches depending upon engine size and when the hitch portion 35 is folded. The width "W" of the stackable tower trailer 10 is about 48 inches wherein like trailers can be placed upon an 8 foot wide flatbed. The draw bar 30 may also be removed from the trailer 10 if longtime storage or field use is expected. The removal of the draw bar 30 makes the unit very compact.

The stacking frame 12 includes an axle 40 that extends the width of the trailer and is pivotally attached to the rear frame member 23. The positioning of the axle 40 in a lowered position as shown by stackable tower trailer 10 in FIGS. 2 and 3, with a left wheel 43 on a first end of the axle 40 and a right wheel 44 on the opposite end of the axle 40. The axle 40 is in a lowered position so as to space the bottom members 14 and 16 above the ground wherein the trailer frame 12 may be towed in an ordinary and conventional manner. When the axle is placed into a raised position the wheels provide no support and the bottom members engage the ground.

As illustrated with adjoining stacking frame 100 in FIGS. 2 and 3, the adjoining stacking frame 100 can be secured directly to the adjoining frame 10. The adjoining frame 100 which is the second stackable tower trailer is of the same shape and placed upon the first tower trailer. In preferred embodiments, the stackable tower trailer comprises two or more stacking frames stacked together. In this illustration the axle 140 is illustrated in a raised position and the width "W" of the trailer remains the same. The positioning of the axle 140 in a raised position allows the bottom members 114 and 116 to rest upon the top members 18 and 20 of the first stackable tower trailer 10. By rotating the wheels upward, multiple frames can be stacked and secured together. The axle 140 is moved from a lowered position to a raised position by use of a hinged axle point 142, wherein connecting bracket 145 is pivotally attached to the bottom member 123 and held in a horizontal position by a lock pin, not shown. Upon removal of the lock pin, the connecting bracket 145 can be rotated into a raised position, wherein the lock pin is used to maintain the wheel 144 in the raised position. The weight of each frame is directed to vertical members 22, 24, 26 and 28 providing corner post support eliminating the need to enhance the axle or wheels to handle loads higher than a single trailer frame. In addition, the upper members 18 and 20 are preferably L-shaped so as to provide a stackable or nesting arrangement for stacked frames. Adjoining frames that are stacked can be temporarily secured together by a fastener 61 for shipping purposes. Once an upper frame is fastened to a lower frame, the securement of the lower frame to a flat bed trailer is sufficient to provide a stable load for transportation. As illustrated, the stackable frame 12, having rear side members 26 and 28, provides rear support for top members 18 and 20. An identical frame as depicted by adjoining stacking frame 100 placed on top of frame 10, with side members 126 and 128 engaging the top members 118 and 120. Apertures are included for receipt of the fasteners 61 to engage additional frames, not shown.

The stacked trailers may be towed by a single vehicle, or left in storage in a stacked position so as to consume less real estate. In addition, the lower wheels 43 and 44 depicted on stacking frame 10 may be raised into an elevated position so as to disable the trailer from movement to provide further stability, as well as prevent theft, as the raised wheels make the trailer immovable except by use of a crane or forklift. The stackable frame 10 includes forklift channels 62 and 64 that are spaced apart, and allow ease of movement with forklift tips that can be inserted beneath the frame for moving one, two or even three stacked trailers, shown in FIG. 3. In a preferred embodiment, the axle 40 is moved from a lowered position to a raised position by use of a hinged axle point 42, wherein connecting bracket 45 is pivotally attached to the bottom member 23 and held in a horizontal position by a lock pin, not shown. Upon removal of the lock pin, the connecting bracket 45 can be rotated into a raised position, wherein the lock pin is used to maintain the wheel 44 in the raised position. The positioning of the wheel above the lower members requires the lower members to be situated on either an adjoining member or a hard surface. In the preferred embodiment the positioning of the wheel by use of the connecting bracket is performed by a mechanical jack, not shown, the removal of which operates as a security device to prevent unauthorized movement of the trailer when the wheel is raised.

As shown in FIGS. 1-3, the stacking frame 10 includes a hinged tower 66, having a proximal end 68 and a distal end 70. The tower is rotated from a horizontal position as indicated by a hydraulic ram 72 so as to cause the tower to be placed in a vertical position. As depicted in the figures, the hinged tower is shown in a horizontal position which is suitable for storage and transporting. The tower can be made of aluminum, fiberglass, carbon fiber, basalt or the like lightweight materials. When used for lighting, a bank of lights 76 is placed along the distal end 70 of the tower wherein the bank of lights may be raised to a height appropriate for the situation. For instance, the bank of lights might be use for road construction, mining, outdoor events, emergencies, or other low lighting situations where electricity is non-existent or unsatisfactory. The hinged tower may be a fixed length or telescoping by extending the distal end of the tower an adjustable distance from the proximal end. In a preferred embodiment, the adjoining stackable frame 100 includes a power source consisting of a generator system 80 having an internal combustion engine mounted to an electric motor to eliminate the weight of a bed plate and reduction of the footprint. A coupling between the engine and generator, such as a belt, can then be preset with little or no need for a belt tensioner. The light bank may include halogen, metal halide fixtures, LED or any other flood light bank the type of which is used to determine the most efficient generator system. The generator system 80 is strategically positioned directly in front of the axle so as to maintain a weight upon a trailer hitch when the fuel tank is low. The fuel tank 82 is positioned over the axle of the trailer, the size of the fuel tank and the generator system designed for long run periods without refueling. Applicant has previous patents that include lightweight and portable generator/engine assemblies that allow for the elimination of the base plate, which otherwise add hundreds of pounds to a conventional generator/engine assembly. U.S. Pat. Nos. 5,765,805 and 6,047,942 disclose lightweight generator/engine assemblies that provide a high electrical output with minimal size and weight, the contents of these patents are incorporated herein by reference. By use of lightweight generator/engine assemblies both the weight and the size of the stackable towers can be reduced when used with lighting elements. As depicted by adjoining stackable frame 100, a similar generator system 180 and fuel tank 182 may form a duplicate trailer to the portable stackable tower trailer 10. In an alternative embodiment, the power source may be a bank of batteries that can be recharged, wherein a portion of the stackable trailer can be used for holding of solar panels. In this embodiment, LED flood light fixtures are preferably coupled to AGM type batteries with mono-crystalline type module solar panels to recharge the batteries. In addition, a small generator system may also be employed in combination with the batteries for those areas that sunlight may not be relied upon to recharge the batteries.

Figure 4:
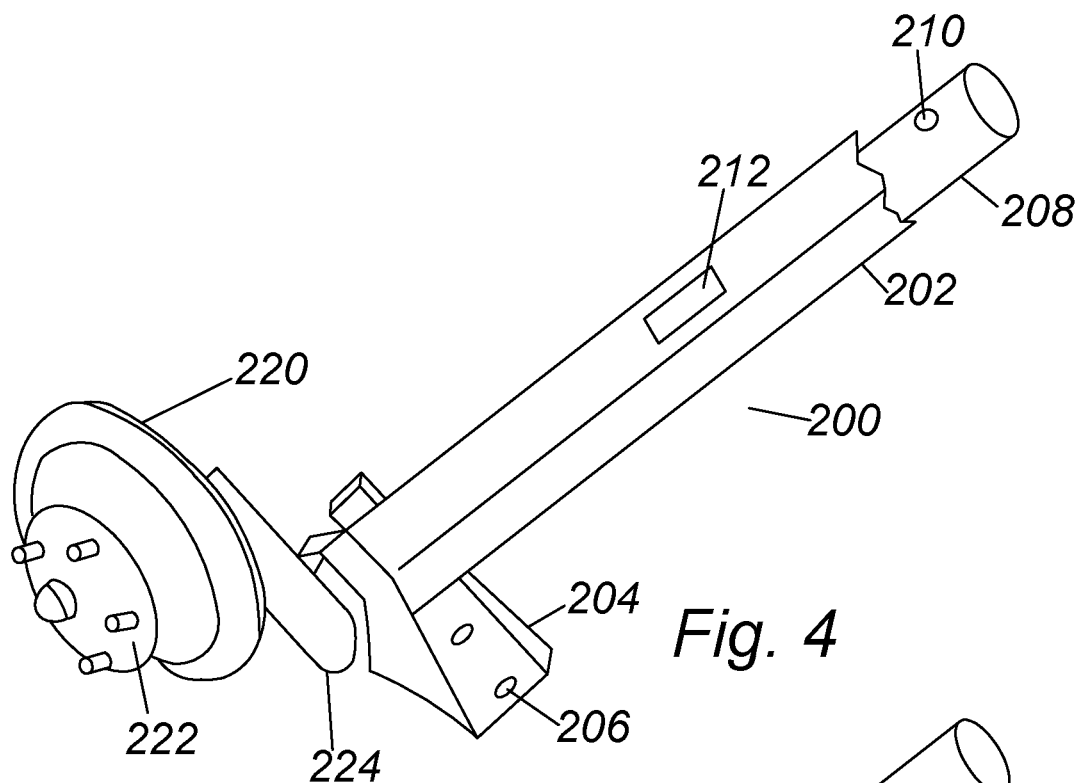
FIG. 4 is an perspective view of a box tube with a rotatable axle in a lower position.
Figure 5:
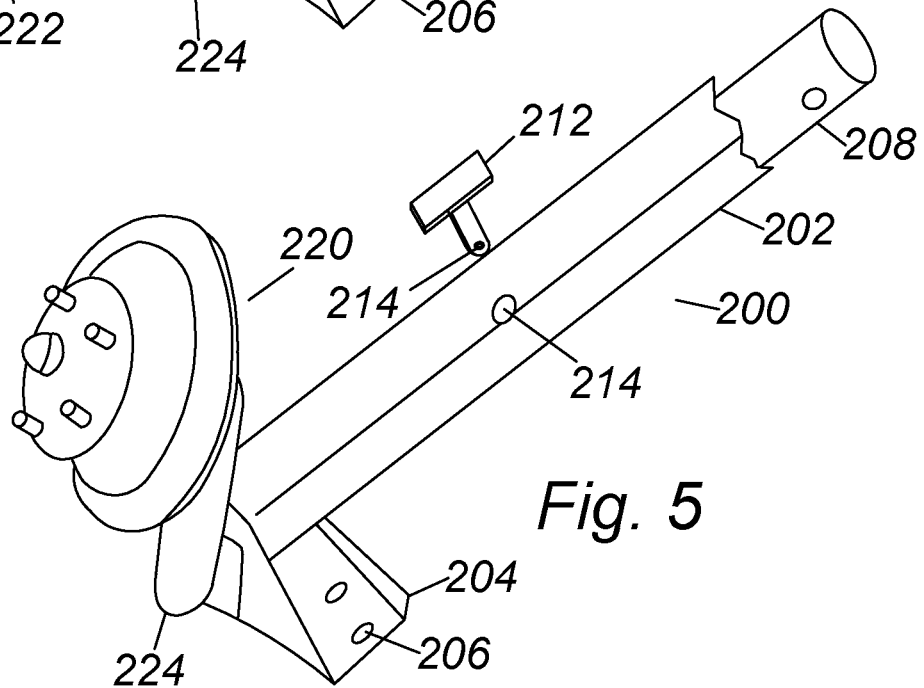
FIG. 5 is a perspective of the rotatable axle illustrated in FIG. 5 in a raised position.

Referring to FIGS. 4 and 5, illustrated is a rotatable axle configuration 200 which permits the raising and lowering of the wheels without the need of the pivot axles previously described. In this embodiment a hollow housing tube 202 extends between the frame of the trailer and is secured to the trailer by either fastener bolts or weldment. Illustrated is a bracket 204 for receipt of fastener bolts through apertures 206. The hollow housing tube 202 depicted is square however the tube can be round or any other geometrical shape. The housing tube 202 receives an axle 208 that can rotate within the housing tube from a lowered position as indicated by securement aperture 210 illustrated in a first position. Upon rotation of the axle 208 the securement aperture 210' is illustrated in a second position in FIG. 5. A latch pin 212 can be placed through an adjoining aperture 214 pinning the axle in a position to maintain the wheels in a lowered or raised position. The latch pin 212 may include a cotter pin opening allowing the latch pin 212 to be secured in position. It should be noted that the latch pin 212 is just but one way of securing the axle in a position, the objective of the axle turning is for movement of the hub 220 from a lowered position illustrated in FIG. 4 to a raised position illustrated in FIG. 5. The hub 220 is conventional and illustrated without a wheel or tire for clarity. A wheel could otherwise be attached by lug nuts 222. The hub 220 is attached to the axle 208 by offset bracket 224. The length of the offset is dependent upon the size of the wheel/tire combination that is to be rotated. The objective of the rotation is to position the hub at a distance that will allow the frame to rest on the ground, or on an adjoining frame. Another objective of the hub rotation is to provide additional clearance between the frames allowing for larger fuel tanks or generators, without adding additional height to the trailer.

Referring to FIGS. 6 and 7, illustrated is another embodiment of the rotatable axle configuration 300 which permits the raising and lowering of the wheels without the need of pivot axles previously described. In this embodiment a circular torsion bar 310 extends between the frame of the trailer and is secured to the trailer by bushings 312 and 314. The torsion bar is preferred constructed from spring steel having a left arm 316 secured to the first end 318 of the torsion bar 310. The left arm 316 includes an axle stub 320 extending at a 90 degree angle from the left arm 316 available for securement of a wheel hub and wheel, not shown. Similarly a right arm 322 is attached to the second end 324 of the torsion bar 310 forming a mirror image of the left arm 316. The right arm 322 includes an axle stub 326 extending from the right arm 322 available for securement of a wheel hub and wheel, not shown. A positioning bar 330 is attached to the torsion bar 310 and is used to secure the torsion bar in a lowered position, as depicted in FIG. 6, wherein the trailer can be moved in a conventional manner. As depicted in FIG. 7, the torsion bar 310 can be rotated wherein the axles stubs 320 and 326 are in a raised position and the positioning bar 330 placed in a securement position. The torsion bar 310 can be fixed in the raised or lowered position by use of a locking means 332, such but not limited to a locking pin, placed through the positioning bar aperture 321 for attachment to a frame boss 334. The torsion bar 310 is able to rotate within the bushings 312 and 314 from the lowered position wherein the frame of the trailer is movable to a raised position wherein the frame of the trailer can be either placed and stacked on the ground or stacked upon another trailer. In place of a locking pin 332, a padlock can be inserted into the aperture 321 as an anti-theft provision.

Hubs and wheels are securable to the stub axles 320 and 326, not shown for clarity. The length of the right and left arm 316 and 322 is dependent upon the size of the wheel/tire combination that is to be rotated. The objective of the rotation is to position the axle at a distance that will allow the frame to rest on the ground, or on an adjoining frame. Another objective of the torsion bar rotation is to provide additional clearance between the frames allowing for larger fuel tanks or generators, without adding additional height to the trailer.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

As used herein, the terms "comprising," "comprise" or "comprised," and variations thereof, in reference to defined or described elements of an item, composition, apparatus, method, process, system, etc. are meant to be inclusive or open ended, permitting additional elements, thereby indicating that the defined or described item, composition, apparatus, method, process, system, etc. includes those specified elements—or, as appropriate, equivalents thereof—and that other elements can be included and still fall within the scope/definition of the defined item, composition, apparatus, method, process, system, etc.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A portable stackable tower comprising:
    a stacking frame formed by a first bottom member and a second bottom member spaced apart from a first top member and a second top member, wherein said stacking frame first bottom member and second bottom member are constructed and arranged to allow nesting on top of an adjoining stacking frame and beneath another stacking frame;
    a draw bar attached to said stacking frame at a first end and securable to a towing vehicle hitch at a second end said draw bar including a pivot connection located between said first and second end to allow positioning of said draw bar in a straight towing position or a folded storage position;
    an axle with a wheel attached to each end of said axle secured to said first and second bottom member of said stacking frame and rotatable from a first position wherein the wheels allow movement of said portable stackable tower, and to a second position wherein the wheels are located in a raised position that allows stacking frame on top of said adjoining frame, said first bottom member and said second bottom member support a structure if no wheels are present or when the wheels are placed in a raised position; and
    a tower hingedly secured to said stacking frame and rotatable from a lowered position placing said tower in a horizontal position and a raised position placing said tower in a vertical position, said tower having a telescoping distal end to extend beyond said stacking frame;
    a plurality of lights secured to said distal end of said tower; and
    an electrical generator coupled to said plurality of lights;
    whereby said portable stackable tower can be stored on top of an adjoining portable stackable tower and be towed independently.

2. The portable stackable tower according to claim 1, wherein said first bottom member and said second bottom member of said stacking frame includes apertures aligned with upper member apertures of an adjoining frame for receipt of a fastener to provide temporary securement to another stacking frame placed thereon.

3. The portable stackable tower according to claim 1, wherein said electrical generator includes an internal combustion engine mounted within said stacking frame.

4. The portable stackable tower according to claim 3, wherein said electrical generator is directly mounted to said internal combustion engine to eliminate the need for a baseplate.

5. The portable stackable tower according to claim 1, wherein said axle is secured to a pair of arms that is hingedly secured to a bottom of said stacking frame, wherein said axle is rotatable from the first position placing a lower portion of the wheel mounted at each end of said axle beneath a bottom of said stacking frame and the second position placing said lower portion of said wheel above bottom of said stacking frame.

6. The portable stackable tower according to claim 1, wherein said axle is further defined as a pair of axle stubs secured to a torsion bar by offset arms, said axle stubs are rotatable from the first position placing the wheel mounted at each end of said axle beneath a bottom surface of said stacking frame and the second position placing said wheel above a lower surface of said stacking frame.

7. The portable stackable tower according to claim 6, wherein said torsion bar is held in position by a fastener.

* * * * *